United States Patent [19]

Hotz

[11] 4,314,765
[45] Feb. 9, 1982

[54] DEGASSER ON A WORM-TYPE MELTING AND CONVEYING DEVICE FOR A PLASTIC INJECTION MOLDING MACHINE

[75] Inventor: Alfons Hotz, Näfels, Switzerland

[73] Assignee: Netstal-Maschinen AG, Switzerland

[21] Appl. No.: 121,980

[22] Filed: Feb. 15, 1980

[30] Foreign Application Priority Data

Mar. 7, 1979 [CH] Switzerland .................. 2204/79

[51] Int. Cl.³ ............................................. B29B 1/10
[52] U.S. Cl. ................................... 366/75; 159/2 E; 425/203; 425/812
[58] Field of Search ................... 366/75; 159/2 E; 425/203, 812, DIG. 60; 264/101, 102

[56] References Cited

U.S. PATENT DOCUMENTS

| | | |
|---|---|---|
| 3,376,603 | 4/1968 | Colombo .......... 159/2 E X |
| 3,410,938 | 11/1968 | Schippers ........ 425/203 X |
| 3,612,141 | 10/1971 | Ocker .................. 159/2 E |

FOREIGN PATENT DOCUMENTS 1103897  2/1968  United Kingdom ............. 425/203

Primary Examiner—Philip R. Coe
Attorney, Agent, or Firm—McGlew and Tuttle

[57] ABSTRACT

In a melting and conveying device for a plastic injection molding machine, having a melting cylinder with a cylindrical bore therein and a worm member in said cylindrical bore, a degasser, comprising, a vent pin extending into the melting cylinder in a degassing zone of the cylinder bore. The vent pin defines a widened charging pocket which communicates with the cylindrical bore and has a vent opening therethrough communicating the pocket to the atmosphere. A pair of heating elements extend into suitably provided openings in the vent pin to selectively heat the vent opening and pocket independently of any heating elements of the plastic injection molding machine to prevent clogging of the pocket and vent opening by solidified plastic material.

5 Claims, 4 Drawing Figures

DEGASSER ON A WORM-TYPE MELTING AND CONVEYING DEVICE FOR A PLASTIC INJECTION MOLDING MACHINE

FIELD AND BACKGROUND OF THE INVENTION

The present invention relates to degassers on worm-type melting and conveying devices of plastic injection molding machines in general and, in particular, to a new and useful degasser having a vent pin arranged in the degassing zone of a melting cylinder of the melting and conveying device adjoining a shearing zone in the direction of conveyance, which pin has a widened charging pocket relative to the cylinder bore which opens to the atmosphere over a pin opening.

The cylinder zones on both sides of such a degassing zone are provided, in a known manner, with heating jackets which ensure, on the one hand, the proper melting of the granulated plastic supplied to the zones preceding the degassing zone and, on the other hand, keep the melted plastic following the degassing zone at a temperature required for an injection molding operation.

The so-called shearing zone forms an area in the melting cylinder, with a relatively small flow volume, while the adjoining degassing zone represents a considerable volume increase. The plasticized material passing through the shearing zone under a relatively high pressure can expand in the degassing zone over the charging pocket and the pin bore, to a lower pressure, that is, to ambient pressure.

In plasticizing hygroscopic plastics, such as acrylonitrile-butadiene-styrene, polycarbonate, or particularly polyamides, for example, PA 6 and PA 6.6, moisture and other volatile substances will diffuse toward the surface of the melt, depending on the moisture content and the cylinder temperatures generated by the heating jackets, due to the pressure gradient between the shearing zone and the degassing zone. From there, such substances can escape through the pin bore.

It was found, in practice, however, that the charging pocket, which should permit easy escape of the gas, due to increased volume, is easily clogged, since the entering material can at least partly solidify in the pin vent arranged in an unheated zone, due to large heat dissipation in this area. The receiving volume of the pocket is thus reduced, which can lead to the issuance of plastic material through the pin bore, particularly with highly hygroscopic material, due to excessive swelling. Excessive swelling could naturally also be achieved by reducing the temperature in the zone preceding the degassing zone. However, this would prevent the complete diffusion of vapor and gases. Particularly when changing the machine over to a different injection material, temporary solidification of material in the pocket is unavoidable, and there is no assurance that the material solidified in the pocket will melt again when the machine is started again.

SUMMARY OF THE INVENTION

The object of the present invention is to provide a degasser of the above-mentioned type which avoids clogging of the charging pocket, which renders the degasser ineffective, independently of the type and the melting temperature of the injection material.

To this end, the degasser according to the invention is characterized in that its vent pin has a heating device which is independent of any heating jackets of the adjacent cylinder zones, which can be regulated independently of such heating jackets.

It is thus possible to keep the parts coming in contact with the molten material, and particularly the wall of the charging pocket, at a temperature which prevents clogging or solidification of the injection material in the pin vent, without having to increase the temperature in the adjacent zones in order to influence or maintain the temperature of the material in the degassing zone. This is of particular advantage after a stoppage of the injection molding machine, e.g., after a change of material. In these cases, solidification of the material in the vent pin is unavoidable. The independently regulable heating of the vent pin, however, permits the melting of material in the vent again, when the machine is started again, so that a satisfactory degassification is immediately insured.

Accordingly, an object of the present invention is to provide a degasser in a melting and conveying device for a plastic injection molding machine, having a melting cylinder with a cylindrical bore therein and a worm member in said cylindrical bore, comprising, a vent pin extending into the melting cylinder in a degassing zone of the cylindrical bore, the vent pin having a charging pocket communicating with the cylindrical bore and a vent opening communicating the pocket with the atmosphere, and heat means connected to said vent pin to heat the pocket and vent openings selectively and separately from any heating in the plastic injection molding machine.

A further object of the present invention is to provide a degasser, comprising, a vent pin having at least one heating element extending parallel to a major axis of the vent pin and into the vent pin.

Another object of the present invention is to provide a degasser which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
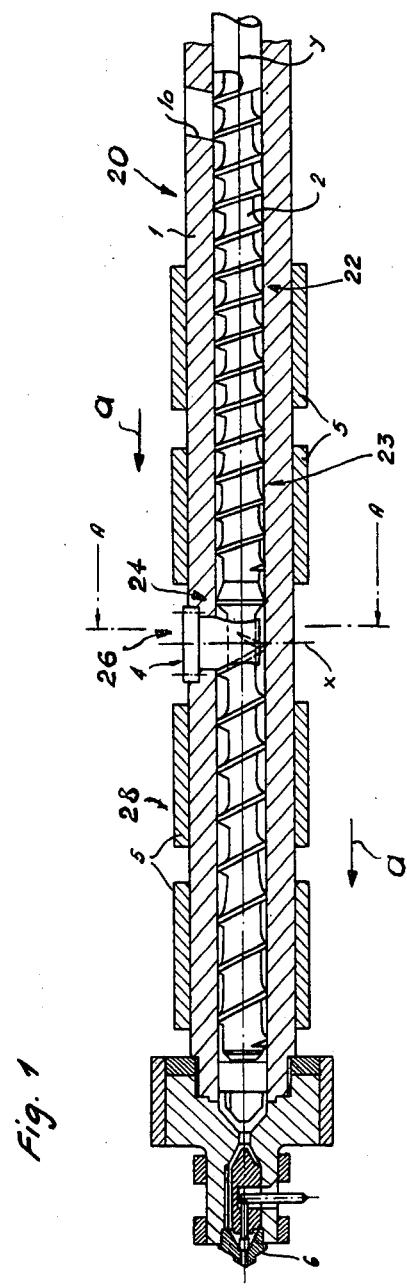
FIG. 1 is an axial cross-sectional view of the melting and injection device of an injection molding machine, with a degasser constructed in accordance with the present invention.

The worm-type melting device of an injection molding machine for processing thermoplastic plastics according to the invention is shown in FIG. 1, and has, in a known manner, a worm member 2 arranged in a cylinder 1. By a corresponding known design of the worm and selection of the core diameter, respectively, a charging zone 20 associated with a material inlet 1a is defined.

Downstream of zone 20, in the direction of movement a of material in cylinder 1 is an adjoining compression zone 22, a metering zone 23, and a shearing zone 24, all formed in a first cylinder part. Adjoining this shearing zone 24 is a degassing zone 26 in which vent pin 4, described in more detail below, is inserted and disposed in a radial bore of cylinder 1.

The cylinder zones preceding the degassing zone 26 in the direction of flow of the material (arrow a) and the following cylinder zones 28 are heatable by means of conventional heating jackets 5 with temperature controls, not shown, which ensure the plasticization and the plastic state of the plastic fed at 1a and conveyed by rotating worm 2 to injection nozzle 6.

Figure 2:
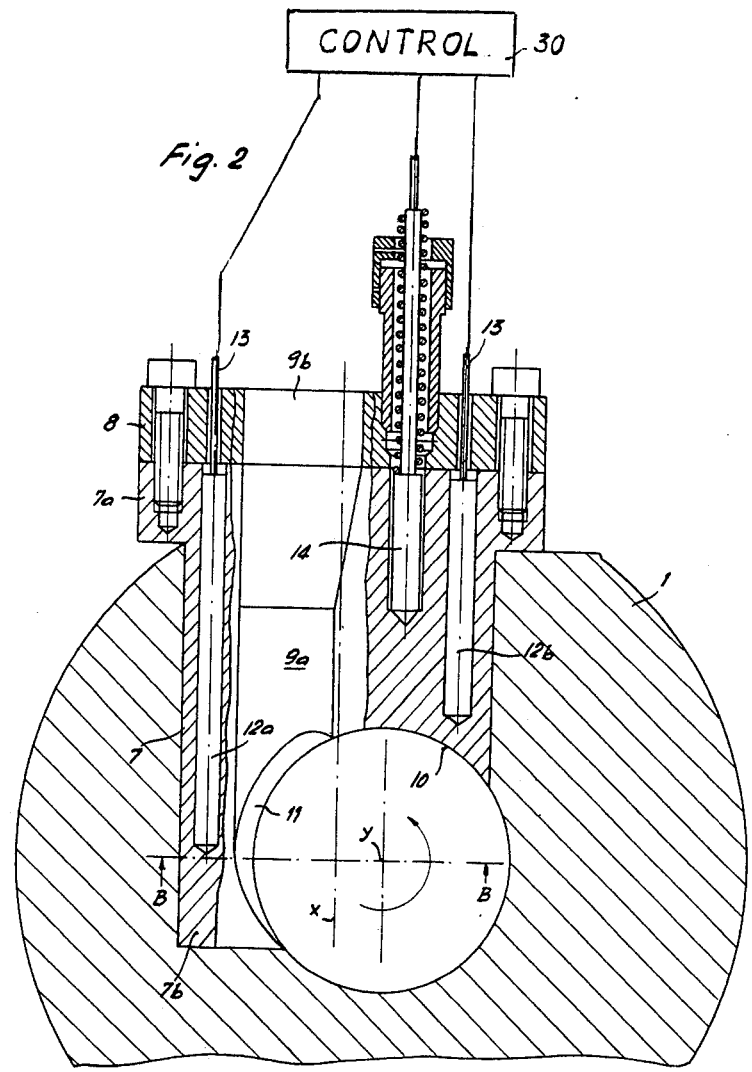
FIG. 2 is a cross-sectional view taken through the vent pin along the line A—A in FIG. 1, on an enlarged scale.
Figure 4:
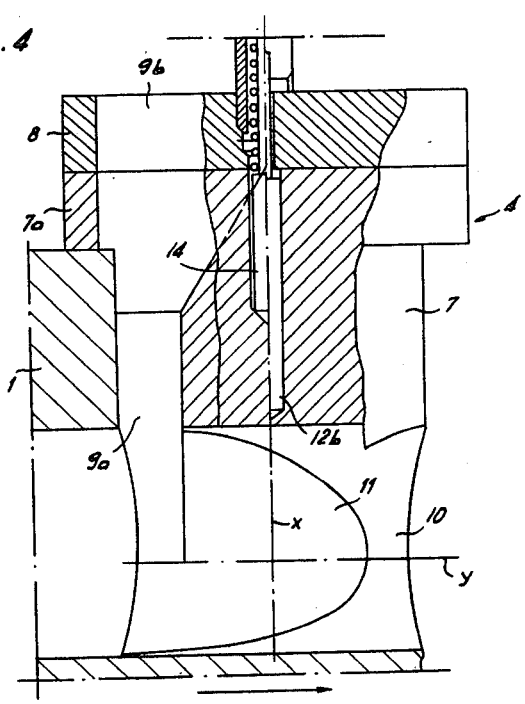
FIG. 4 is a sectional view taken along line C—C in FIG. 3.

As shown in FIGS. 2 and 4, vent pin 4 has a cylindrical body 7 with outer supporting flange 7a, on which a cover plate 8 is screwed. Pin 4 is provided with a groove 9a, extending parallel to the axis x of pin 4 in the range of the vent pin body which is open to the atmosphere. Groove 9a communicates with an opening 9b which is substantially rectangular in cross-section, and extends through flange 7a and cover plate 8 above it.

The bottom part of the vent pin 4 is provided with a transverse bore section 10 corresponding to the bore of cylinder 1 and at a right angle to pin axis x. Section 10 is thus a continuation of the cylinder bore. The bottom part 7b of pin 4 is thus reduced to a jacket part extending under worm axis y, as seen particularly in FIG. 2. The transverse bore section 10 is complemented by the corresponding inner wall of cylinder 1 in the area of the pin to form a fully cylinder bore.

The heating device of vent pin 4 comprises, in the embodiment represented, two heating elements 12a and 12b inserted into paraxially extending bores of the pin 4 which are connected over terminals 13, which extend through cover plate 8 to the outside. Terminals 13 are connected to a temperature control device 30. A temperature sensor 14 which is likewise arranged in a paraxially extending bore of the pin 4 is connected to the control device 30. Control 30 controls the heating of heaters 12a and 12b according to the sensed temperature from sensor 14 to maintain the temperature at a selected level, for example, above the plastic material melting point, as needed.

Figure 3:
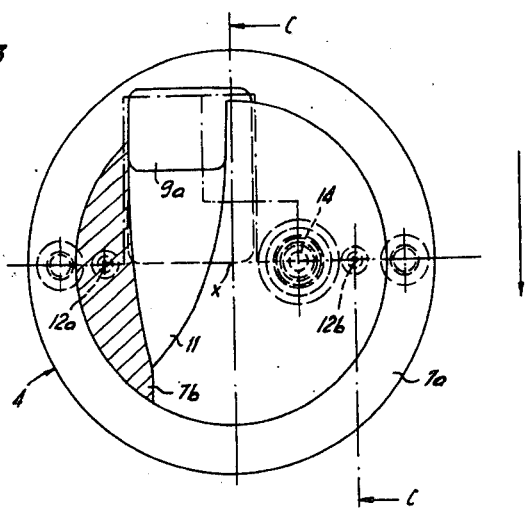
FIG. 3 is a cross-sectional view taken along line B—B in FIG. 2.

As seen from FIGS. 2 and 3, heating element 12a is arranged so that it protrudes into the area of jacket part 7b and thus can particularly effectively heat the part of the pin 4 with the pin opening 9a, 9b and charging pocket 11, while the other heating element 12b is diametrally opposed to the former and thus permits the heating of the remaining part of the pin 4, limiting the cylinder bore at the top.

Due to the above-described design of the degasser, the viscosity of the plasticized injection material can be so influenced by differentiated tempering of the vent pin regarding the adjacent temperature zones of the worm cylinder that any material plug in opening 9a, 9b of the vent pin, as they appear as stoppages, are melted down again without the necessity of increasing the temperature in the adjacent cylinder zones. The degassification process is thus easier to control. Clogging of the charging pocket of the vent holes during operation can be avoided.

Particularly when processing highly hygroscopic substances, such as polyamide 6.6, vapor pressures of up to 88 bar are produced, depending on the moisture content of the material and the adjusted cylinder temperatures. This causes the melt to swell in the melting cylinder, but the additional volume can only be partly absorbed by the interval remaining between the worm and the cylinder. The result is that the vent hole is clogged by the swelling polyamide melt and prevents the free escape of gas. Lowering the cylinder temperatures adjacent the vent hole 9a below the melting range of about 255° C. for polyamide 6.6 would increase the viscosity of the melt and thus reduce the swelling tendency, but a satisfactory degasification would no longer be ensured because of the insufficiently molten granulated material. With the crystalline material polyamide, clogging is tantamount to solidification of the melt, since the material has a pronounced melting point.

Due to the use of a heated vent pin, according to the invention, it is possible to heat the pin partially to 280° C., for example, and to melt down the material in the charging pocket and in the vent hole clogged by the melt, without influencing the adjacent heating zones. Similar considerations apply to the processing of other hygroscopic materials, such as acrylonitrile-butadiene-styrene, styrene-acrylonitrile, polyethyl methacrylate, polycarbonate and others.

While a specific embodiment of the invention has been shown and described in detail to illustrate the application of the principles of the invention, it will be understood that the invention may be embodied otherwise without departing from such principles.

What is claimed is:

1. In a melting and conveying device for a plastic injection molding machine, having a melting cylinder with a cylindrical bore therein and a worm member in the cylindrical bore, a degasser, comprising, a vent pin extending into the melting cylinder in a degassing zone of the cylindrical bore, said vent pin having a charging pocket communicating with the cylindrical bore and a vent opening communicating the pocket with the atmosphere, and heat means connected to said vent pin for heating the pocket and vent opening separately of any other heating in the plastic injection molding machine, said heat means comprising at least one heating element extending into said vent pin parallel to a major axis of said vent pin, said heating element extending into the vicinity of said charging pocket.

2. In a melting and conveying device, a degasser according to claim 1, further including a sensor element extending into said vent pin parallel to the major axis of said vent pin, and control means connected to said sensor and to said heating element to selectively energize said heating element to heat said charging pocket and vent opening.

3. In a melting and conveying device, a degasser according to claim 2, further including one additional heating element extending into said vent pin parallel to the major axis of said vent pin, said additional heating element extending into said vent pin on a side thereof opposite from the major axis of said vent pin.

4. In a melting and conveying device, a degasser according to claim 3, wherein said vent pin includes a sectional cylindrical portion forming a part of the cylindrical bore of said melting cylinder, said vent pin including a jacket portion extending downwardly and around a portion of the cylindrical bore beyond a major axis of the cylindrical bore, said first mentioned heating element extending into said jacket.

5. In a melting and conveying device, a degasser according to claim 4, wherein said charging pocket is defined adjacent said jacket.

* * * * *